United States Patent [19]

Lee

[11] Patent Number: 5,370,572
[45] Date of Patent: Dec. 6, 1994

[54] ELECTRICAL TOY BABY CART

[76] Inventor: Fan-Shen Lee, No. 134, Sec. 1, Chung Cheng Rd., San Hsia Chen, Taipei Hsien, Taiwan, Prov. of China

[21] Appl. No.: 192,576

[22] Filed: Feb. 7, 1994

[51] Int. Cl.⁵ .................... A63H 29/02; A63H 3/00; B62B 1/00
[52] U.S. Cl. .................... 446/462; 446/487; 446/268; 280/642; 280/647; 280/649
[58] Field of Search ............ 446/462, 457, 470, 487, 446/268, 269, 275; 180/116, 65.1, 907; 280/630, 641, 642, 643, 647, 649, 650

[56] References Cited

U.S. PATENT DOCUMENTS

| | | | |
|---|---|---|---|
| 3,167,146 | 1/1965 | Rudolph | 180/65.1 X |
| 3,756,333 | 9/1973 | Rubin | 180/166 X |
| 4,431,076 | 2/1984 | Simpson | 180/907 X |
| 4,629,950 | 12/1986 | Ching | 180/166 X |
| 4,776,415 | 10/1988 | Brice | 180/907 X |
| 5,074,575 | 12/1991 | Bigo | 280/647 X |

FOREIGN PATENT DOCUMENTS 2281865 4/1976 France .................. 280/650
2618400 1/1989 France .................. 280/641

Primary Examiner—Robert A. Hafer
Assistant Examiner—D. Neal Muir
Attorney, Agent, or Firm—Varndell Legal Group

[57] ABSTRACT

An electrical toy baby cart includes two handles. Two front frames and two rear frames are respectively and pivotally connected to the bottoms of the handles. A front wheel holder is fastened to the bottoms of the front frames and supported on two front wheels, and a rear wheel axle is fastened to the bottoms of the rear frames and supported on two rear wheels. A battery box arranged between said front and rear frames. A transmission gear box, a control box electrically connected to the battery box and having a motor controlled to drive the transmission gear box, and two transmission wheels driven by the transmission gear box to move the electrical toy baby cart are provided within the front wheel holder. When the handles are pressed downward and then turned downward toward the front frames, the top projecting block at the top end of each rear frame is moved away from the top projecting block at the top end of either front frame for permitting the electrical toy baby cart to be collapsed.

1 Claim, 5 Drawing Sheets

5,370,572

ELECTRICAL TOY BABY CART

BACKGROUND OF THE INVENTION

The present invention relates to toy baby carts and, more particularly, to an electrical toy baby cart which can be conveniently collapsed.

Various electrical toy baby carts have been disclosed for children to play with. These electrical toy baby carts are made on a small scale but functioned like rear motor-driven baby carts. However, these electrical toy baby carts are neither collapsible nor detachable, and therefore they need much storage space when they are not used in play.

One object of the present invention is to provide an electrical toy baby cart which is collapsible. Another object of the present invention is to provide an electrical toy baby cart which is detachable and can be conveniently assembled by the consumers. According to a preferred embodiment of the present invention, the electrical toy baby cart comprises two handles, two front frames and two rear frames respectively and pivotally connected to the bottoms of the handles, a front wheel holder fastened to the bottoms of the front frame and supported on two front wheels, a rear wheel axle fastened to the bottoms of the rear frames at the bottom and supported on two rear wheels, a battery box, transmission gear box, a control box electrically connected to the battery box and having a motor controlled to drive the transmission gear box, two transmission wheels driven by the transmission gear box to move the electrical toy baby cart. When the handles are pressed down and turned forwards and downwards toward the front flames, the top projecting block at the top end of each rear frame is moved away from the top projecting block at the top end of either front frame for permitting the electrical toy baby cart to be collapsed.

DETAILED DESCRIPTION OF THE PREFERRED EMBODIMENT

Figure 1:
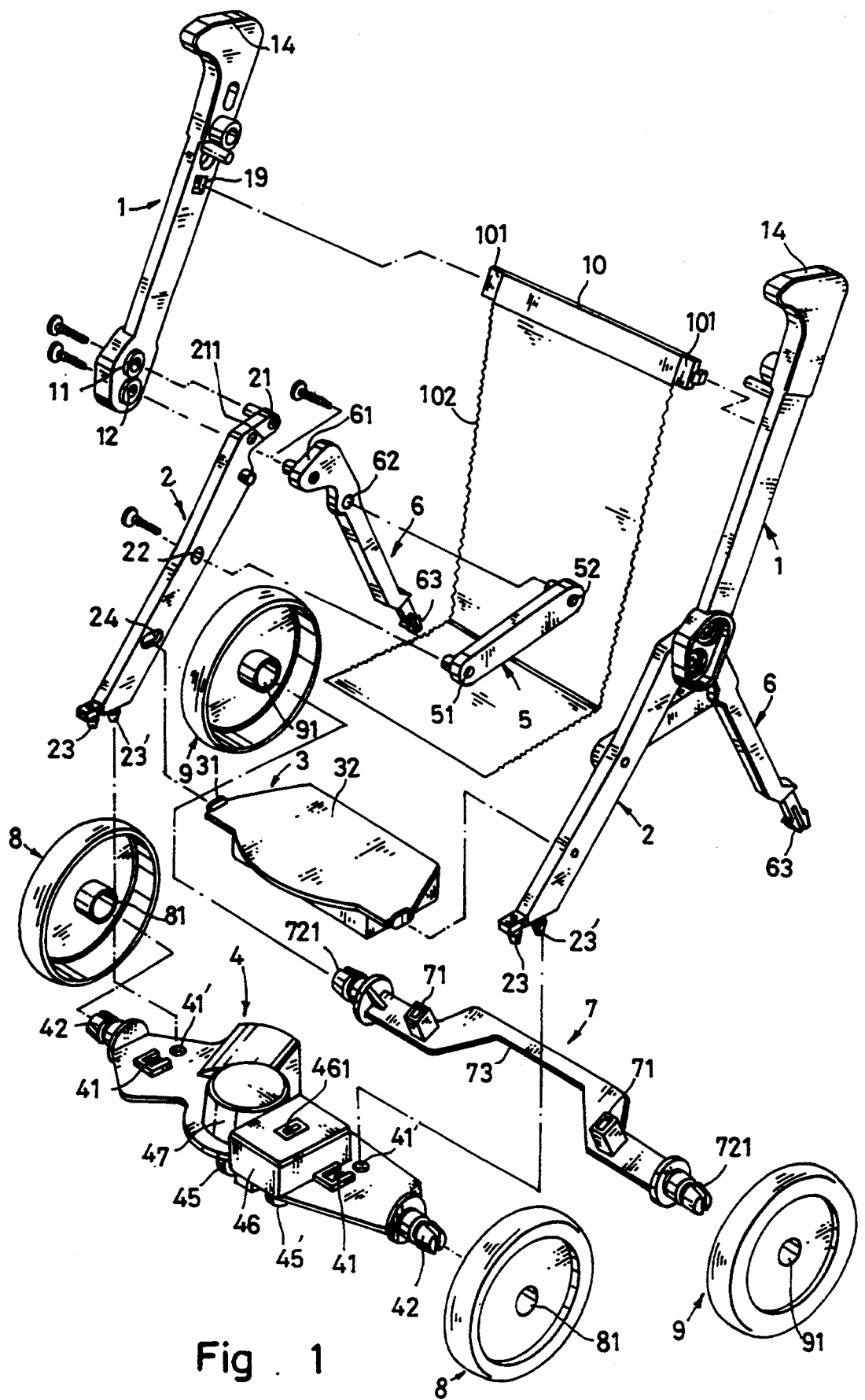
FIG. 1 is an exploded view of an electrical toy baby cart according to the preferred embodiment of the present invention.
Figure 2:
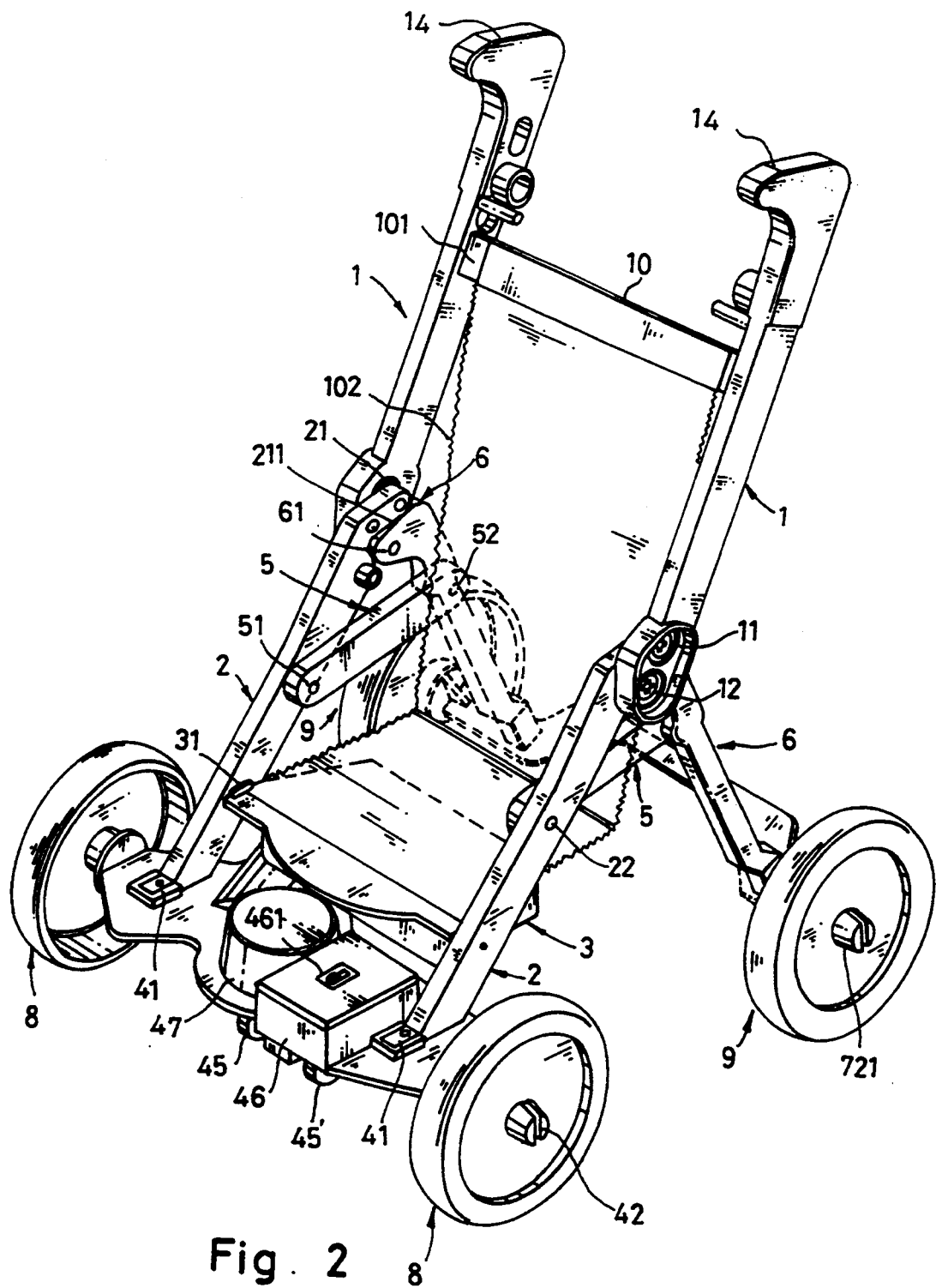
FIG. 2 is an elevational view of the electrical toy baby cart shown in FIG. 1.

Referring to FIGS. 1 and 2, an electrical toy baby cart in accordance with the preferred embodiment of the present invention is generally comprised of a pair of handles 1, a pair of front frames 2, a battery box 3, a front wheel holder 4, a pair of links 5, a pair of rear frames 6, a rear wheel axle 7, a pair of front wheels 8, a pair of rear wheels 9, and a seat cushion 10.

The handles 1 comprise a first pivot hole 11 and a second pivot hole 12 vertically spaced at its bottom, a retaining hole 19 in its middle, and a hand grip 14 at its top.

The front frames 2 comprise a top projecting block 21 at the top end thereof pivotally connected to the first pivot hole 11 on either handle 1, which has a bottom edge 211 stopped above either rear frame 6, a pivot hole 22 in its middle, which receives one end of either link 5, two bottom pins 23, 23' extended downwards from the bottom end thereof and fitted into a respective pin hole 41 or 41' on the front wheel holder 4, and a retaining hole 24 between the pivot hole 22 and the bottom pins 23, 23', which receives either end of the battery box 3.

The battery box 3 comprises a box shell 32 having two mounting rods 31 at two opposite ends thereof respectively engaging the retaining hole 24 on either front frame 2.

The front wheel holder 4 has a transmission gear box 47 at its top in its middle, a control box 46 disposed at one side of the transmission gear box 47 and electrically connected to the battery box 3 and controlled by a control switch 461 to turn a motor (not shown) causing it to drive the transmission gear box 47, two transmission wheels 45, 45' disposed at the bottom and driven by the transmission gear box 47 to move the electrical toy baby cart, two pairs of pin holes 41, 41' spaced at two opposite ends thereof, which receive the bottom pin 23, 23' of either front frame 2, and two wheel axles 42 aligned at two opposite ends thereof.

The front wheel 8 has a center axle hole 81 mounted on either wheel axle 42 of the front wheel holder 4.

The links 5 have a front end 51 pivotally connected to the pivot hole 22 on either front frame 2, and a rear end 52 pivotally connected to a respective pivot hole 62 on either rear frame 6.

The rear frames 6 comprise a top projecting block 61 at the top thereof pivotally connected to the second pivot hole 12 on either handle 1 and stopped at the bottom edge 211 of the top projecting block 21 of either front frame 2, a pivot hole 62 in its middle, which receives the rear end 52 of either link 5, and a tenon 63 at the bottom end thereof fitted into a respective mortise 71 on the rear wheel axle 7.

The rear wheel axle 7 comprises a curved axle body 73 having two opposite ends 721 respectively inserted into the center axle hole 91 on either rear wheel 9, and two mortises 71 spaced at its top, which receive the bottom tenon 63 of either rear frame 6. Because the axle body 73 of the rear wheel axle 7 is made curved, it does not touch the box shell 32 of the battery box 3 when the electrical toy baby cart is collapsed.

The seat cushion 10 comprises a cushion box 102 fastened to and covering the battery box 3 and having two mounting rods 101 bilaterally disposed at its top and respectively engaged into the retaining hole 19 on either handle 1.

Figure 3:
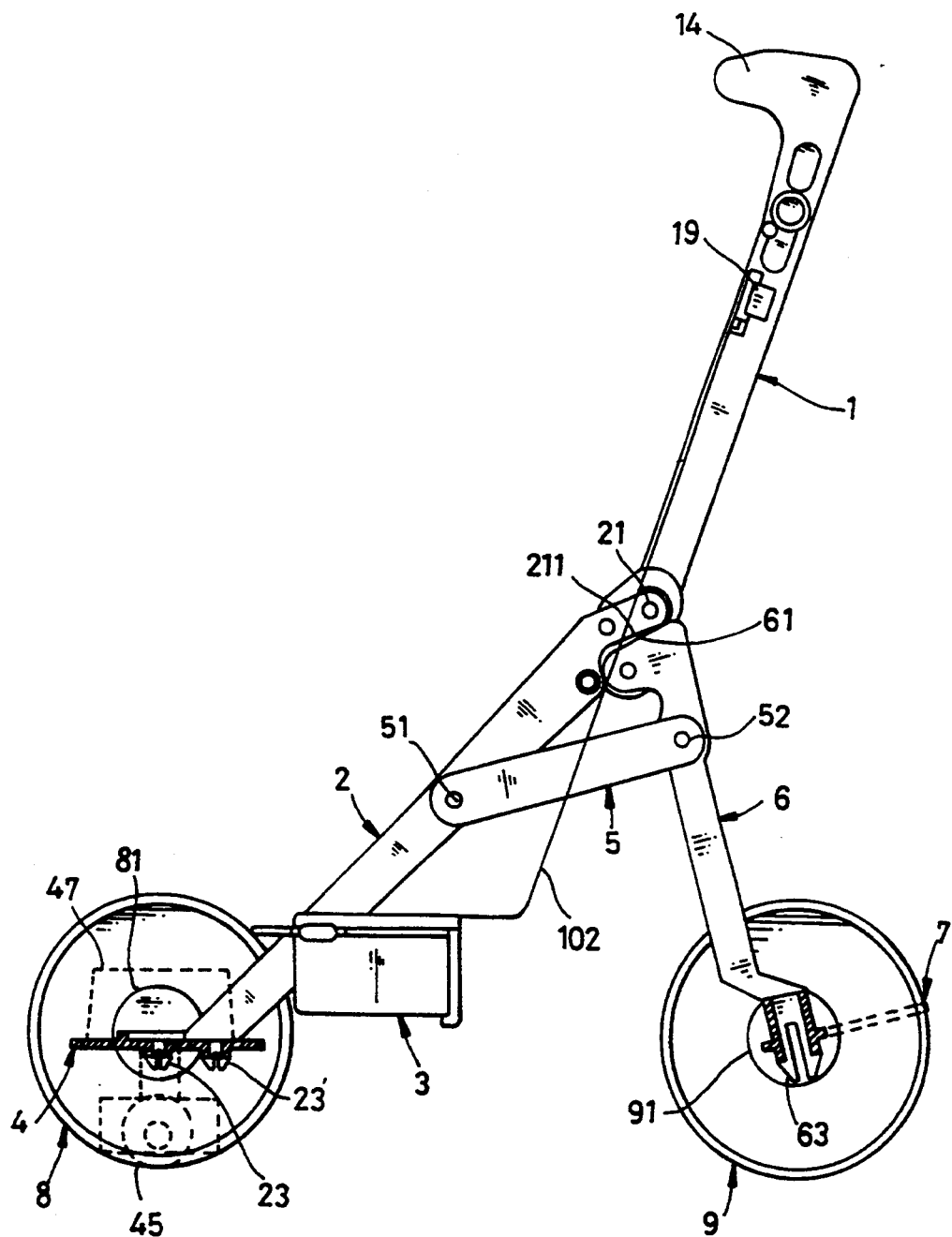
FIG. 3 is a side view in section of the electrical toy baby cart shown in FIG. 2.
Figure 4:
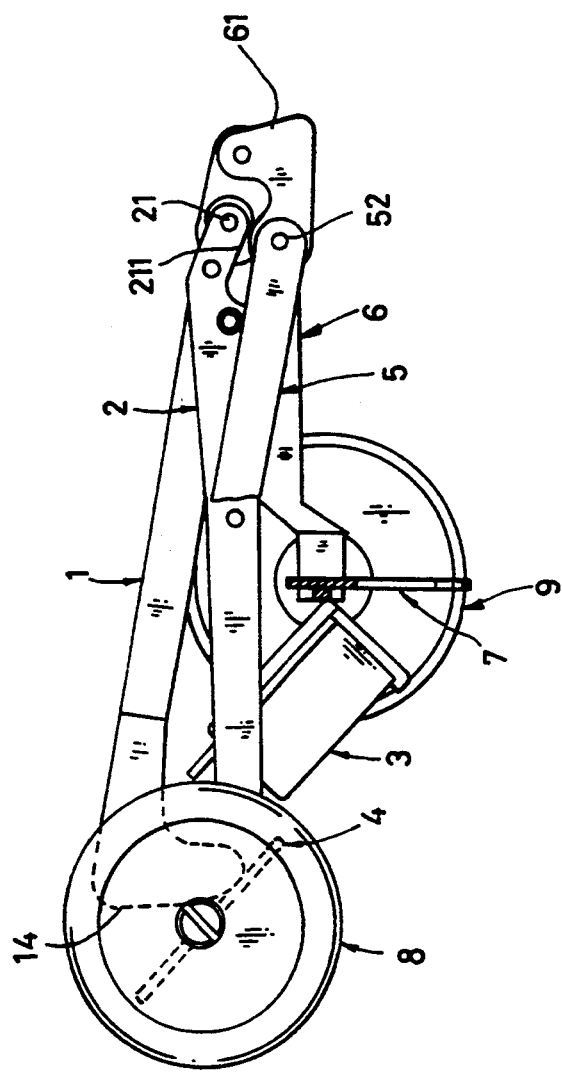
FIG. 4 shows the electrical toy baby cart of FIG. 3 collapsed.

Referring to FIGS. 3 and 4, by pressing the handles 1 downward, the hand grips 14 of the handles 1 can be turned forwards and downwards toward the front flames 2 respectively causing the top projecting block 61 of each rear frame 6 to disconnect from the top projecting block 21 of the respective front frame 2, and therefore the electrical toy baby cart is collapsed (see FIG. 4). On the contrary, by turning the hand grips 14 of the handles 1 upwards away from the front frames 2, the top projecting block 61 of each rear frame 6 is respectively moved back to its former position and stopped against the bottom edge 211 of the top projecting block 21 of the respective front frame 2, and therefore the electrical toy baby cart is turned to the working position.

Because the aforesaid parts are detachably, parents can teach their children to assemble the electrical toy baby cart.

Figure 5:
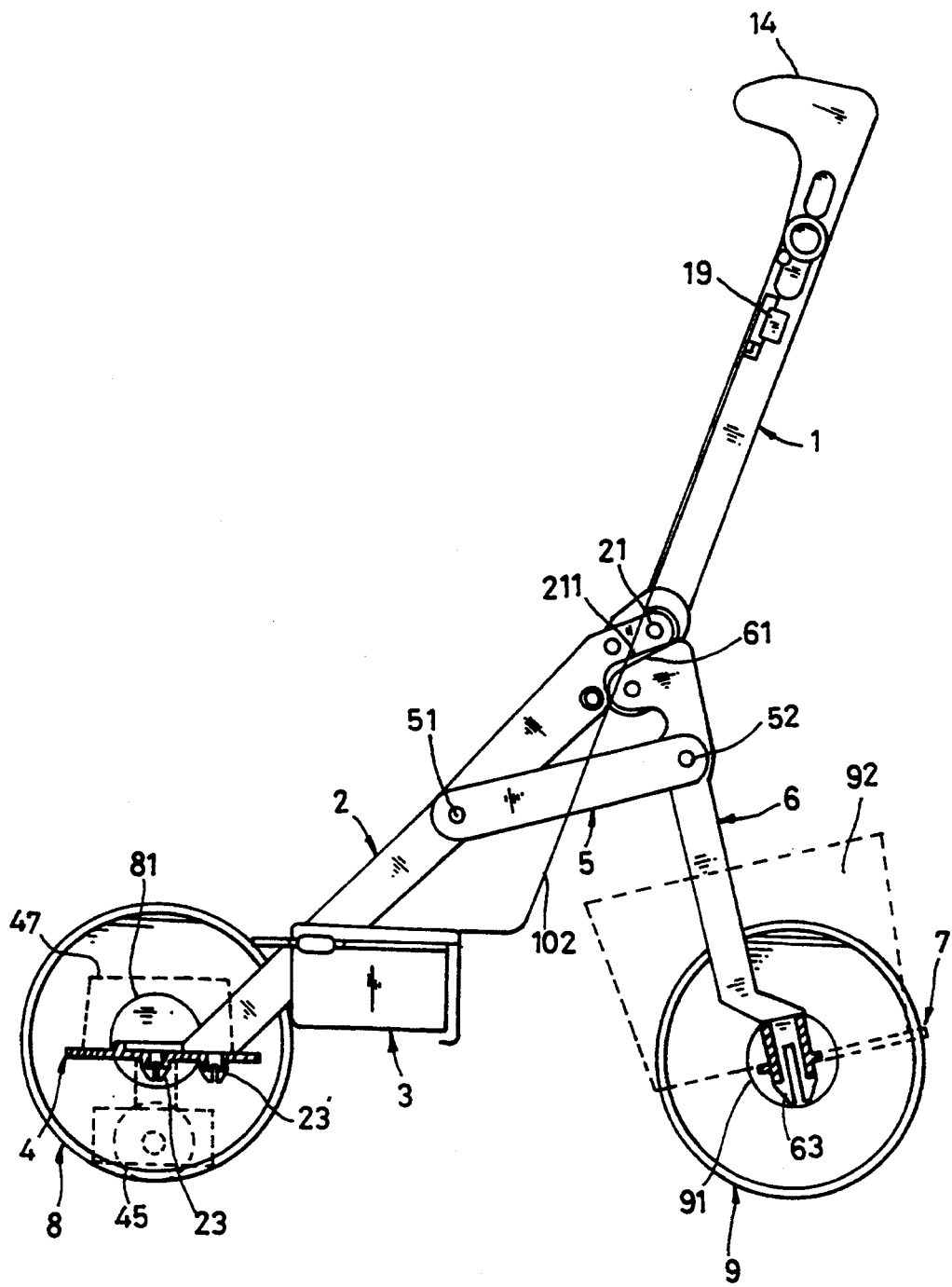
FIG. 5 is similar to FIG. 3 but showing a basket mounted.

Referring to FIG. 5, a basket 92 may be mounted between the rear frame 6 above the rear wheel axle 7.

While only one embodiment of the present invention has been shown and described, it will be understood that various modifications and changes can be made without departing from the spirit and scope of the invention. For example: dolls, toy musical instrument, canopy, etc., may be mounted on the electrical toy baby cart at suitable locations that do not hinder the frame structure from being collapsed.

What is claimed is:

1. An electrical toy baby cart comprising:

two handles, each handle having a bottom with vertically spaced first and second pivot holes, a middle with a retaining hole, and a top with a hand grip;

two front frames respectively pivoted to said bottoms of said handles, each said front frame including a top projecting block pivotally connected to a respective said first pivot hole on said handles by a pivot pin, a middle with a pivot hole, a bottom with two bottom pins, and a retaining hole located between said pivot hole and said bottom pins;

a battery box having two mounting rods at two opposite ends thereof respectively engaged into said retaining holes on a said front frames;

a front wheel holder connected to said bottoms of said front frames, said front wheel holder including a top with a centrally arranged transmission gear box electrically connected to said battery box through a control switch and controlled to operate said transmission gear box, and a bottom with two transmission wheels driven by said transmission gear box to move said electrical toy baby cart; said front wheel holder further including two pairs of pin holes spaced at two opposite ends thereof and respectively receiving said bottom pins of said front frames, and two wheel axles alinged at said two opposite ends and supported by a respective front wheel;

two rear frames respectively pivoted to said bottoms of said handles, each said rear frame including a top projecting block pivotally connected to a respective said second pivot hole on said handles by a pivot pin and stopped against a respective said top projecting block of said front frames, a middle with a pivot hole, and a bottom with a tenon;

two links respectively linked between said front frames and said rear frames, each link having a front end pivotally connected to a respective said pivot hole on said front frames by a pivot pin and a rear end pivotally connected to a respective said pivot hole on said rear frames by a pivot pin;

a rear wheel axle connected to said bottoms of said rear frames, said rear wheel axle having a curved axle body with two opposite ends supported on a respective rear wheel, and a top with two spaced mortises receiving a respective said bottom tenon of said rear frames; and a seat cushion covering said battery box and having a top with two bilaterally disposed mounting rods engaging a respective said retaining hole on said handles;

wherein when said handles are pressed downward and then turned to move said hand grips toward said front frames, said top projecting blocks of said rear frames are respectively moved away from said top projecting blocks of said front frames for permitting said electrical toy baby cart to be collapsed.

* * * * *